US012807840B2

(12) United States Patent
Zafar et al.

(10) Patent No.: US 12,807,840 B2
(45) **Date of Patent: *Nov. 24, 2026**

(54) PROCESS FOR PREPARING A BONDING RESIN FOR USE IN A COATING

(71) Applicant: Stora Enso OYJ, Helsinki (FI)

(72) Inventors: Ashar Zafar, Älta (SE); Li Jansson, Älta (SE)

(73) Assignee: Stora Enso OYJ, Helsinki (FI)

( * ) Notice: Subject to any disclaimer, the term of this patent is extended or adjusted under 35 U.S.C. 154(b) by 1000 days.

This patent is subject to a terminal disclaimer.

(21) Appl. No.: 17/757,262

(22) PCT Filed: Dec. 16, 2020

(86) PCT No.: PCT/IB2020/061997

§ 371 (c)(1),
(2) Date: Jun. 13, 2022

(87) PCT Pub. No.: WO2021/124126

PCT Pub. Date: Jun. 24, 2021

(65) Prior Publication Data

US 2024/0010874 A1 Jan. 11, 2024

(30) Foreign Application Priority Data

Dec. 20, 2019 (SE) .................................. 1951515-4

(51) Int. Cl.

*C09D 197/00* (2006.01)
*C08H 7/00* (2011.01)
*C08L 97/00* (2006.01)

(52) U.S. Cl.

CPC ........... *C09D 197/005* (2013.01); *C08H 6/00* (2013.01); *C08L 97/005* (2013.01)

(58) Field of Classification Search

CPC .................................................. C09D 197/005
See application file for complete search history.

(56) References Cited

U.S. PATENT DOCUMENTS

| | | | | |
|---|---|---|---|---|
| 2,247,210 | A | 6/1941 | Schorger | |
| 8,911,976 | B2 * | 12/2014 | Uraki | C07G 1/00 435/162 |
| 12,163,064 | B2 * | 12/2024 | Nasli Bakir | B27N 3/002 |
| 12,286,565 | B2 * | 4/2025 | Zafar | B27N 1/003 |
| 2006/0083766 | A1 | 4/2006 | Miyata et al. | |
| 2012/0148740 | A1 | 6/2012 | Yang et al. | |
| 2015/0329753 | A1 * | 11/2015 | Billington | C09J 197/005 527/400 |

FOREIGN PATENT DOCUMENTS

| | | | | |
|---|---|---|---|---|
| JP | 2011116930 | A | 6/2011 | |
| JP | 2019073679 | A | 5/2019 | |
| WO | 2006031175 | A1 | 3/2006 | |
| WO | 2014095800 | A1 | 6/2014 | |
| WO | 2015044893 | A1 | 4/2015 | |
| WO | WO-2018195000 | A1 * | 10/2018 | C07C 41/01 |

OTHER PUBLICATIONS

Extended European Search Report from corresponding European application No. EP20901520.5 dated Dec. 11, 2023.
Yoshiro Takada et al., Preparation and Properties of Bio-Based Epoxy Montomorillonite Nanocomposites Derived from Polyglycerol Polyglycidyl Ether and &-Polylysine, Journal of Applied Polymer Science, vol. 113, 479-484 (2009).
International Search Report from corresponding PCT application No. PCT/IB2020/061997 dated Feb. 26, 2021.
Li, Russell Jingxian et al., A lignin-epoxy resin derived from biomas as an alternative to formaldehyde-based wood adhesives, Green Chem., 2018, 20, 1459.
Engelmann, Gunnar et al., Bio-based epoxy resins with low molecular weight kraft lignin and pyrogallol, Holzforschung 2014; 68(4); 435-446.

* cited by examiner

*Primary Examiner* — Michael F Pepitone
(74) *Attorney, Agent, or Firm* — Greer, Burns & Crain, Ltd.

(57) ABSTRACT

The present invention relates to a process for preparing a bonding resin suitable for use in coatings. The invention is directed to a method for preparing a bonding resin for use in a coating, wherein a solution of lignin in an organic solvent is mixed with polyglycerol polyglycidyl ether and optionally one or more additives.

7 Claims, No Drawings

PROCESS FOR PREPARING A BONDING RESIN FOR USE IN A COATING

This application is a U.S. National Phase under 35 U.S.C. § 371 of International Application No. PCT/IB2020/061997, filed Dec. 16, 2020, which claims priority under 35 U.S.C. §§ 119 and 365 to Swedish Application No. 1951515-4, filed Dec. 20, 2019.

FIELD OF THE INVENTION

The present invention relates to a process for preparing a bonding resin suitable for use in coatings.

BACKGROUND

Lignin, an aromatic polymer is a major constituent in e.g. wood, being the most abundant carbon source on Earth second only to cellulose. In recent years, with development and commercialization of technologies to extract lignin in a highly purified, solid and particularized form from the pulp-making process, it has attracted significant attention as a possible renewable substitute to primarily aromatic chemical precursors currently sourced from the petrochemical industry.

Lignin, being a polyaromatic network has been extensively investigated as a suitable substitute for phenol during production of phenol-formaldehyde adhesives. These are used during manufacturing of laminate and structural wood products such as plywood, oriented strand board and fiberboard. During synthesis of such adhesives, phenol, which may be partially replaced by lignin, is reacted with formaldehyde in the presence of either basic or acidic catalyst to form a highly cross-linked aromatic resins termed novolacs (when utilizing acidic catalysts) or resoles (when utilizing basic catalysts). Currently, only limited amounts of the phenol can be replaced by lignin due to the lower reactivity of lignin.

A problem with existing coating formulations is that they are not produced from renewable materials. There is a trend in the coating industry to develop the coating formulations using high content of bio-based and renewable materials. Both governmental and non-governmental agencies have developed regulations and guidelines to quantify bio-based content in coatings.

One problem when preparing resins comprising lignin is the use of formaldehyde, when the lignin is used in formaldehyde-containing resins, such as lignin-phenol-formaldehyde resins. Formaldehyde based resins emit formaldehyde, which is a toxic volatile organic compound. The present and proposed legislation directed to the lowering or elimination of formaldehyde emissions have led to the development of formaldehyde free resin for wood adhesive applications.

Jingxian Li R. et al. (Green Chemistry, 2018, 20, 1459-1466) describes preparation of a resin comprising glycerol diglycidyl ether and lignin, wherein the lignin is provided in solid form. One problem with the technology described in the article is a long pressing time and high pressing temperature. The 3 plies plywood sample was pressed at 150° C. temperature for 15 minutes to fully cure the resins.

Engelmann G. and Ganster J. (Holzforschung, 2014, 68, 435-446) describes preparation of a biobased epoxy resin with low molecular weight kraft lignin and pyrogallol, wherein the lignin component consists of an acetone extraction from Kraft lignin.

WO2014095800 is related to coatings comprising lignin. The coatings are prepared by mixing a lignin, a solvent and a crosslinker to form a mixture which is used as a coating composition. Radical polymerization is used in the process for preparing the polymeric crosslinker and a radical initiator is therefore added.

A problem of prior art methods is the use of radical reactions in the method of preparation of the bonding resins and coatings comprising lignin.

SUMMARY OF THE INVENTION

It has now surprisingly been found that it is possible to prepare an improved bonding resin suitable for use in coatings, in which the use of formaldehyde can be avoided. It has also been found that an improved bonding resin and thus improved coating can be achieved and that the use of radical reactions in the method of preparation of the bonding resin and coating can be avoided. Thereby the method of preparation is easier and the use of very reactive radical initiator can be avoided. The crosslinker used herein is a liquid, prepared by step growth polymerization, can be directly used as a crosslinker. The process of aqueous dispersion by chain growth polymerization (free radical polymerization) can thereby be avoided.

Thus, the present invention is directed to a method for preparing a bonding resin suitable for use in a coating, wherein lignin is provided in the form of a solution in organic solvent and mixed with polyglycerol polyglycidyl ether and optionally one or more additives. The bonding resin is useful for example in the manufacture of coatings for paper, wood or metal substrates.

More specifically, the present invention is directed to a method for preparing a bonding resin suitable for use in a coating, wherein a solution of lignin in organic solvent is mixed with polyglycerol polyglycidyl ether and optionally one or more additives.

The present invention is also directed to the bonding resin obtainable using the method described herein and to the use of the bonding resin in the manufacture of coatings, such as coatings applied on metal surfaces or wood or other substrates. Examples thereof include coil coatings, general industrial coatings, metal cans, containers or agricultural and construction equipment. The present invention is also directed to such coated substrates.

DETAILED DESCRIPTION

It is intended throughout the present description that the expression "lignin" embraces any kind of lignin, e.g. lignin originated from hardwood, softwood or annular plants. Preferably the lignin is an alkaline lignin generated in e.g. the Kraft process. Preferably, the lignin has been purified or isolated before being used in the process according to the present invention. The lignin may be isolated from black liquor and optionally be further purified before being used in the process according to the present invention. The purification is typically such that the purity of the lignin is at least 90%, preferably at least 95%. Thus, the lignin used according to the method of the present invention preferably contains less than 10%, preferably less than 5% impurities. The lignin may then be separated from the black liquor by using the process disclosed in WO2006031175. The lignin may then be separated from the black liquor by using the process referred to as the LignoBoost process. The lignin may be provided in the form of particles, such as particles having an average particle size of from 50 micrometers to 500 micrometers.

Typically, the bonding resin according to the present invention is applied to the surface of a substrate to be coated. The cross-linking in the bonding resin then takes place, resulting in a coating.

The weight ratio between lignin (dry weight) and the total amount of polyglycerol polyglycidyl ether is preferably in the range of from 0.1:10 to 10:0.1, such as from 1:10 to 10:0.3, such as from 5:10 to 5:0.3, such as from 1:10 to 10:1. The amount of lignin in the bonding resin is preferably from 5 wt-% to 50 wt-%, calculated as the dry weight of lignin and the total weight of the bonding resin.

As used herein, the term organic solvent means a carbon-based substance that is used to dissolve another substance or substances. Since the organic solvent is carbon-based, it has at least one carbon atom in its structure. The organic solvent also has at least one hydrogen atom. As used herein, the organic solvent is a liquid at 25° C.

Preferably, the organic solvent is selected from ketones (such as acetone, methyl ethyl ketone (MEK), methyl isobutyl ketone (MIBK), methyl amyl ketone (MAK), Isophrone), esters (butyl acetate, ethyl acetate, methoxy propyl acetate (MPA), butylglycol acetate), alcohols (butanol, isopropanol), glycol ethers (ethylene glycol monobutyl ether, butyl glycol ether etc.), or hydrocarbons (naphtha, xylene etc.) or ethers or bio-based solvents (dihydrolevoglucosenone, cyrene etc.) mixture thereof.

According to the present invention, the solution of lignin in organic solvent is prepared before mixing the solution of lignin in organic solvent with the polyglycerol polyglycidyl ether.

The solution of lignin in organic solvent is preferably mixed with the polyglycerol polyglycidyl ether at room temperature, such as at a temperature of from 15° C. to 30° C. The mixing is preferably carried out for about 5 seconds to 2 hours. Preferably, the viscosity of the mixture is monitored during mixing, either continuously or by taking samples and determining the viscosity thereof.

The method for preparation of the bonding resin according to the present invention does not involve radical polymerization. Further, no radical initiator is used in the method for preparation of the bonding resin according to the present invention.

The bonding resin may also comprise 1-20 wt-% additives, such as urea, tannin, solvents, surfactants, dispersing agents and fillers. The bonding resin may also comprise coupling agent. Coupling agents are for example silane-based coupling agents.

The bonding resin according to the present invention contains less than 1 wt-% of solvent other than organic solvents, preferably less than 0.5 wt-%, more preferably 0 wt-%.

The amount of urea in the bonding resin can be 0-40% preferably 5-20% calculated as the dry weight of urea and the total weight of the bonding resin.

A filler and/or hardener can also be added to the bonding resin. Examples of such fillers and/or hardeners include limestone, cellulose, sodium carbonate, and starch.

The reactivity of the lignin with the polyglycerol polyglycidyl ether can be increased by modifying the lignin by glyoxylation, etherification, esterification or any other method where lignin hydroxyl content or carboxylic content or amine content or thiol content is increased. Preferably, the lignin used according to the present invention is not modified chemically.

The coating compositions can be applied to substrates in any manner known to those skilled in the art. In some embodiments, the coating composition comprising the bonding resin according to the present invention is sprayed or roll coated onto the substrate. The bonding resins may be pigmented and/or opacified with known pigments and opacifiers. Thus, for non-limiting example, spraying, rolling, dipping, and flow coating application methods can be used for both clear and pigmented coating. In some embodiments, after application onto a substrate, the coating may be cured thermally at temperatures in the range from about 130° C. to about 250° C., and alternatively higher for time sufficient to effect complete curing as well as volatilizing of any fugitive component therein.

For substrates intended as coil coatings, the coating compositions may be applied at a rate in the range from about 0.5 to about 15 milligrams of polymer coating per square inch of exposed substrate surface. In some embodiments, the water-dispersible coating is applied at a thickness between about 1 and about 25 microns.

EXAMPLES

Example 1

Lignin solution was prepared first by adding 63.2 g of powder lignin (solid content 95%) and 140 g of ethylene glycol monobutyl ether (EGME) were added to a 500 mL glass reactor at ambient temperature and were stirred for 120 minutes to make sure that the lignin was completely dissolved.

Example 2

Coating formulation was prepared by weighing 50 g of the lignin solution from the example 1, 15 g of polyglycerol polyglycidyl ether weighing into a 250 ml plastic container and stirred with a wooden stick for 2 minutes. Coating formulation was applied on an aluminum metal sheet using a film applicator. Then, the metal sheet was baked in an oven at 200° C. for 10 minutes. The cured coating was able to withstand 30 MEK double rubs, it had 100% adhesion (by cross hatch tape off method), a 2H pencil hardness and no cracking from bending the metal sheet at 0 T. The coated panel was bent back on itself with the coating side out. If there was no crack at the edge, the result was reported as 0 T. After 1 hour in boiling water, the film was not blushed.

Example 3

Coating formulation was prepared by weighing 50 g of the lignin solution from the example 1, 5 g of polyglycerol polyglycidyl ether weighing into a 250 ml plastic container and stirred with a wooden stick for 2 minutes. Coating formulation was applied on an aluminum metal sheet using a film applicator. Then, the metal sheet was baked in an oven at 200° C. for 10 minutes. The cured coating was able to withstand 30 MEK double rubs, it had 100% adhesion (by cross hatch tape off method), a 2H pencil hardness and no cracking from bending the metal sheet at 0 T. After 1 hour in boiling water, the film was not blushed.

Example 4

Lignin solution was prepared first by adding 84.2 g of powder lignin (solid content 95%) and 120 g of diacetone alcohol (DAA) were added to a 500 mL glass reactor at ambient temperature and were stirred for 120 minutes to make sure that the lignin was completely dissolved.

Example 5

Coating formulation was prepared by weighing 50 g of the lignin solution from the example 4, 20 g of polyglycerol polyglycidyl ether weighing into a 250 ml plastic container and stirred with a wooden stick for 2 minutes. Coating formulation was applied on an aluminum metal sheet using a film applicator. Then, the metal sheet was baked in an oven at 200° C. for 10 minutes. The cured coating was able to withstand 30 MEK double rubs, it had 100% adhesion (by cross hatch tape off method), an HB pencil hardness and no cracking from bending the metal sheet at 0 T. After 1 hour in boiling water, the film was not blushed.

In view of the above detailed description of the present invention, other modifications and variations will become apparent to those skilled in the art. However, it should be apparent that such other modifications and variations may be effected without departing from the spirit and scope of the invention.

The invention claimed is:

1. A method for preparing a bonding resin for use in a coating of a metal substrate, the method comprising:

generating lignin in a Kraft process;

mixing a solution of the lignin in an organic solvent with polyglycerol polyglycidyl ether to provide a bonding resin, wherein the lignin is not chemically modified; and, coating a metal substrate with the bonding resin.

2. The method according to claim 1, wherein the bonding resin contains less than 1 wt-% solvent other than an organic solvent.

3. The method according to claim 1, wherein the solution of lignin in the organic solvent comprises at least 5% by weight of lignin.

4. The method according to claim 1, wherein a weight ratio between lignin, calculated on a basis of dry lignin, and a total amount of polyglycerol polyglycidyl ether is from 0.1:10 to 10:0.1.

5. The method according to claim 1, wherein an additive is mixed with the solution of lignin, wherein the additive is selected from a group consisting of urea, tannin, surfactant, a solvent, a dispersing agent, a filler, and combinations thereof.

6. The method according to claim 1, wherein the organic solvent is selected from a group consisting of ketones, esters, alcohols, hydrocarbons, ethers, dihydrolevoglucosenone, and mixtures thereof.

7. The method according to claim 1, wherein an additive is mixed with the solution of lignin.

* * * * *